March 24, 1942. G. C. LYNCH 2,277,241
PORTABLE MIRROR DEVICE
Filed Feb. 28, 1938
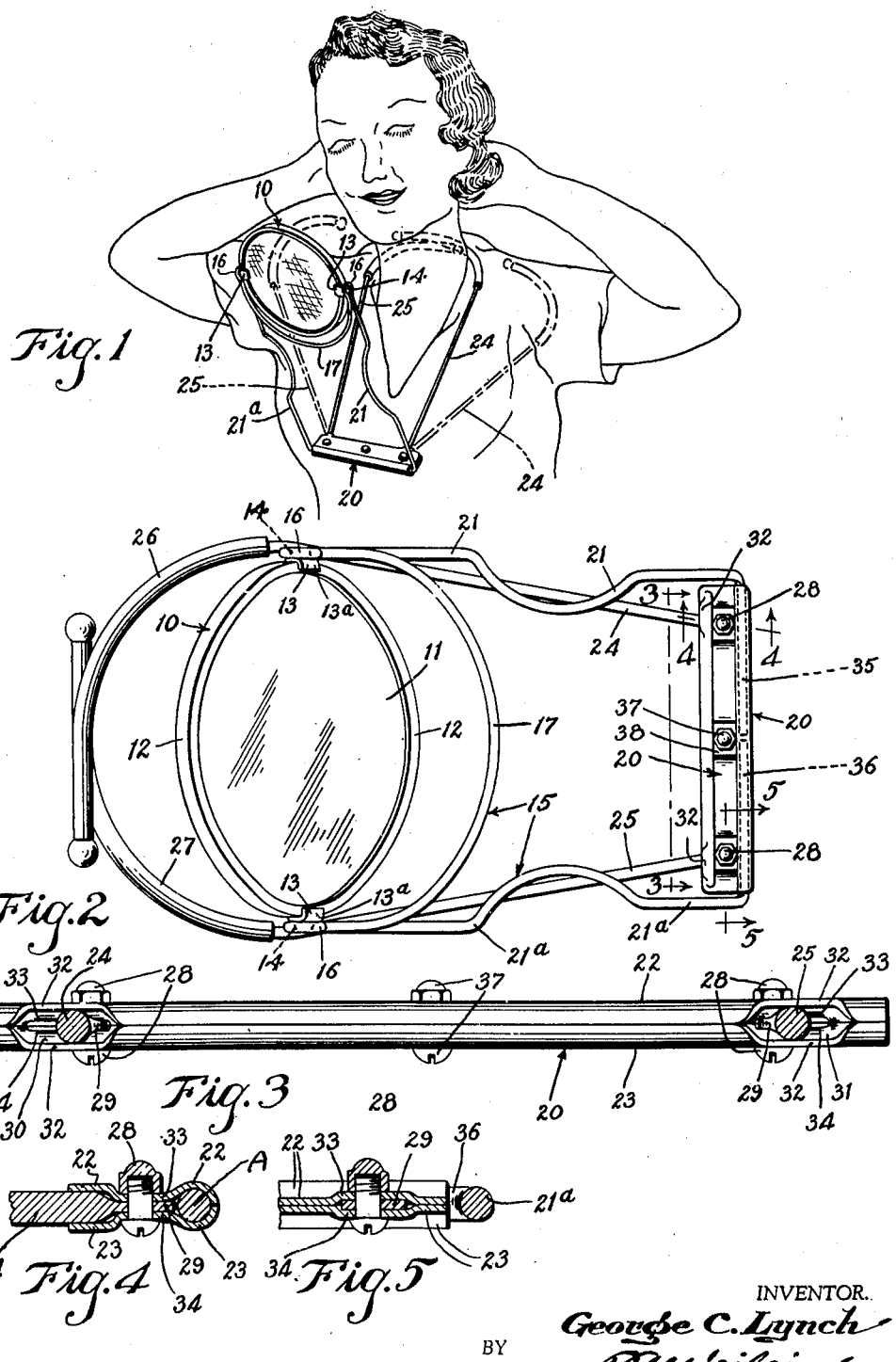
INVENTOR.
George C. Lynch
BY
ATTORNEY.

Patented Mar. 24, 1942

2,277,241

UNITED STATES PATENT OFFICE 2,277,241

PORTABLE MIRROR DEVICE

George C. Lynch, Los Angeles, Calif., assignor, by mesne assignments, to George C. Lynch and Josephine A. Lynch, as joint tenants, with right of survivorship Application February 28, 1938, Serial No. 193,093

6 Claims. (Cl. 88—101)

This invention relates to a portable mirror device, and more specifically to that type of device which is adapted for support upon the body of the user.

An object of the invention resides in the provision of a portable mirror device having improved hanger and hinge means for supporting the mirror from the body of the wearer.

A further object of the invention is to provide a portable mirror device including an improved hinge construction cooperable with a pair of hangers which are adapted to support the mirror from the body of the user.

Another object of the invention involves a portable mirror device having a pair of hangers which are adjustable in substantially the same plane with respect to each other and angularly adjustable relative to the mirror.

Still a further object of the invention is to provide a portable mirror device having hanger means cooperable with a hinge construction, whereby the hanger means is movable with respect to the hinge in a plane generally including said hinge, said hanger means and hinge being jointly movable relative to said mirror about an axis lying generally in said plane.

Yet another object of the invention is to provide a portable mirror device having a pair of cooperating hangers adapted to embrace the neck of the wearer in overlapping relationship.

A further object of the invention is to provide a portable mirror device which is optionally supportable upon the body of a wearer or upon a stationary structure, such as a dressing table or the like.

Another object of the invention is to provide a portable mirror device having a pair of hangers which will remain in various positions of adjustment with respect to each other.

A still further object of the invention is the provision of a portable mirror device having an elongated hinge cooperable with a pair of hangers to form a rigid support for the mirror upon the body of the user.

This invention possesses many other advantages and has other objects which will be made more easily apparent from a consideration of the embodiment thereof shown in the accompanying drawing and forming a part of the present specification. I shall now proceed to describe this form in detail which illustrates the general principles of my invention; but it is to be understood that this description is not to be taken in a limiting sense, since the scope of the invention is best defined by the appended claims.

Figure I is a perspective view of the portable mirror device shown in position upon the user.

Figure II is a top plan view of the device in adjusted position for support upon a dressing table or the like.

Figure III is a sectional view on an enlarged scale, taken as indicated by line 3—3 of Figure II.

Figure IV is a sectional view on an enlarged scale, taken as indicated by line 4—4 of Figure II; and Figure V is a sectional view on an enlarged scale, taken as indicated by line 5—5 of Figure II.

As indicated in the drawing, the portable mirror device contemplated by the present invention includes a mirror 10, having one or more reflecting surfaces 11, held in a divided frame 12, which is maintained in assembled relationship by a pair of clips 13, positioned at diametrically opposite portions of the frame and adapted to hold the divided portions together by the snug engagement of the parallel side wings 13a, on each clip with the adjacent ends of the frame. The divided frame is also provided with a pair of extending members (not shown) which are embraced by a trunnion 14 on each clip. By means of these trunnions the mirror and frame are pivotably held in a supporting structure 15, preferably formed of wire and including looped portions 16, frictionally engaging the trunnions to hold the mirror in various adjusted positions with respect to the supporting structure. The structure further includes a curved portion 17, connecting the loops and being inherently tensioned for clamping the mirror, divided frame, and clips together.

The aforementioned parts are carried by a hinge 20, through the agency of upright portions 21 and 21a, of the supporting structure 15, extending from the loops 16, and having their lower portions bent substantially at right angles and inwardly toward each other to be frictionally held between a pair of opposed clamp portions 22 and 23, forming part of the hinge. Further advantages and details of construction of the parts described are fully disclosed and claimed in the co-pending application of Stephen S. Crosby, Serial Number 65,314, filed February 24, 1936, entitled Toilet accessory which has matured into Patent #2,117,407, of May 17, 1938. These will not be included in the instant application, since they are not essential to an understanding of the present invention.

In the application referred to, a single hanger is disclosed as being frictionally held in the hinge for movement about an axis parallel to the trunnion axis of the mirror. This limits the extent of relative motion between the hanger and the mirror, requiring that the entire portable device be applied to a wearer from an essentially side position until the hanger embraces the neck of the wearer, whereupon it may be swung about the neck to position the mirror in front of the user. A feature of the present invention includes the mounting of a pair of cooperable hanger members on the hinge in such a manner as to permit their adjustability about axes which are parallel and perpendicular to the mirror trunnion axis. Through this arrangement the device may be initially placed directly in front of the wearer, after which the hangers may be moved toward each other to embrace the neck without interfering with the initial position of the mirror.

Referring more specifically to the accompanying drawing, a pair of hanger members 24 and 25 are provided with cushion encased curved portions 26 and 27 respectively, adapted to engage the neck of the wearer, said cushioning material making for added comfort. The hangers are pivotally connected to the hinge 20 by means of bolts 28 extending through the clamping elements 22 and 23 of the hinge and through holes provided in a flattened end 29 of the hangers 24 and 25. The pivoted ends of the hangers extend through apertures 30 and 31 formed by cooperative outwardly bent portions 32—32 of the clamping elements 22 and 23, their flattened ends being frictionally held between the raised bosses 33 and 34 formed on the respective clamping elements 22 and 23. The apertures 30 and 31 will permit swinging movement of the hangers 24 and 25 with respect to the hinge 20, the cooperative bosses 33 and 34 frictionally engaging the flattened ends 29 of the hangers with sufficient force to permit their intentional pivotal swinging about the bolts 28 while holding them in any position of adjustment.

The bolts 28 serve a two-fold function. They provide the fulcrums about which the hangers 24 and 25 can swing, and also hold the clamping elements 22 and 23 together so that they will engage the inturned ends 35 and 36 of the standard uprights 21 and 21a with sufficient force to frictionally hold the standard 15 in various positions of adjustment with respect to the hinge 20. In this latter function the clamping action will be enhanced by the assistance of an intermediate bolt 37 engageable with the raised bosses 38 provided on the clamping elements 22 and 23.

Because of the manner in which the hangers and uprights are mounted on the hinge, the device may be readily placed upon the wearer and removed therefrom. This is attributable to the ability of the hangers to pivot about axes which are substantially at right angles to the pivotal axis of the uprights in the hinge. As will be seen from Figure 1, the hangers can be moved in a plane including the hinge and axis from the broken line position, in which the extremities of their curved ends are sufficiently spaced apart for clearing the neck when applying the device to the wearer, to the full line position, wherein the curved ends embrace the neck of the wearer for maintaining the device in usable position. It will be noted that in moving between these two positions, it is unnecessary to interfere with the general position of the mirror and hinge in front of the wearer.

In addition to their ability to pivot about the fulcrum bolts 28, the hangers 24 and 25 can also be moved angularly with respect to the supporting uprights 21—21a, and consequently, with respect to the mirror. This can be accomplished by jointly moving the hangers and hinge 20 about the axis (A) relative to the uprights and mirror.

The hinge 20 is preferably elongated to provide a stable support for the device upon the chest of the wearer. Additional stability is provided by the use of the hangers 24 and 25, whose pivot points are spaced apart on the hinge and whose curved end portions overlap one another when embracing the wearer's neck. It is apparent that by this arrangement of parts there is little likelihood of mirror motion from an adjusted position.

The spaced apart uprights 21—21a and the elongated hinge 20 provide a wide range of application for the mirror device. In addition to being adapted for use upon the wearer, the device can also be arranged for support upon a stationary object such as a dressing table. All that need be done is to provide an acute angle between the hangers and the uprights, facing the mirror outwardly of this angle. The provision of the curved, cushioned hanger portions 26 and 27 lying in a plane including the hinge 20, assists in the stability of support of the mirror when used in this manner.

I claim:

1. A portable mirror device which comprises a mirror, a hinge including a pair of elongated cooperative clamping elements, means mounting said mirror, said means being pivotally secured between said clamping elements for movement about an axis, a pair of hanger elements having end portions held between said clamping elements, and spaced apart fulcrum means for holding said clamping elements in operative position and for pivotally mounting said hanger elements for movement about axes generally perpendicular to said first named axis.

2. A portable mirror device which comprises an elongated member adapted to engage the front of the body of a wearer in a transverse position, a mirror support pivotally mounted on said elongated member for swinging movement about an axis generally longitudinal of said member, a pair of hangers pivotally supported by said elongated member for movement about individual spaced-apart axes substantially perpendicular to said axis, said hangers having portions curved toward each other in a plane substantially perpendicular to said spaced-apart axes and movable substantially in said plane for cooperatively passing around the neck of a wearer.

3. A portable mirror device which comprises an elongated member adapted to engage the front of the body of a wearer in a transverse position, a mirror support pivotally mounted on said elongated member for swinging movement about an axis generally longitudinal of said member, a pair of hangers pivotally supported by said elongated member for movement about individual spaced-apart axes substantially perpendicular to said axis, said hangers having portions curved toward each other in a plane substantially perpendicular to said spaced-apart axes and movable substantially in said plane for cooperatively passing around the neck of a wearer, the free ends of said hangers overlapping when around the neck of the wearer, and means holding said hangers in selected positions.

4. A portable mirror device which comprises an elongated member adapted to engage the front of the body of a wearer in a transverse position, a mirror support including spaced elements, said elongated member being pivotally connected at its ends with said spaced elements to permit swinging movement of said mirror support about an axis generally longitudinal of said elongated member, a pair of hangers pivotally connected to said elongated member near its pivotal connections with said spaced elements for movement about axes substantially perpendicular to said axis, said hangers having portions curved toward each other in a plane substantially perpendicular to said spaced-apart axes and movable substantially in said plane for cooperatively passing around the neck of a wearer.

5. A portable mirror for connection with the body of the user comprising a transverse bracing member arranged to rest on the breast of the user, a reflector, a standard pivotally connected at its outer end with the reflector and pivotally connected at its inner end with said transverse bracing member, a pair of hook members shaped at their outer ends to encircle the opposite sides and the back of the neck of the user, and means pivotally connecting the inner ends of said hook members to said transverse bracing member for pivotal movement in a plane substantially parallel to the plane of the breast of the user and in directions transversely of the neck of the user for sidewise engagement with the neck, the hook-shaped outer ends of said hook members being disposed in approximately a common plane transversely of the neck of the user and opening inwardly in opposed directions toward the neck of the user.

6. A portable mirror device for connection with the body of the user comprising a transverse bracing member arranged to rest on the breast of the user, a reflector, a standard pivotally connected at its outer end with the reflector and pivotally connected at its inner end with said transverse bracing member, a pair of hook members shaped at their outer ends to encircle the opposite sides and the back of the neck of the user, means connecting the inner ends of said hook members to said transverse bracing member for swinging movement in a plane substantially parallel to the plane of the breast of the user and in directions transversely of the neck of the user for sidewise engagement with the neck, the hook shaped outer ends of said hook members being disposed in approximately a common plane transversely of the neck of the user and opening inwardly in opposed directions toward the neck of the user.

GEORGE C. LYNCH.